US012605986B2

(12) United States Patent
Jeong et al.

(10) Patent No.: US 12,605,986 B2
(45) Date of Patent: Apr. 21, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Hoyoung Jeong, Hwaseong-si (KR); Hochan An, Hwaseong-si (KR); Yeonho Kim, Seoul (KR); Gwi Taek Kim, Cheonan-si (KR); Man Hee Park, Suwon-si (KR); Yeong Jun Kim, Incheon (KR); Jae Yeon Kim, Hwaseong-si (KR); Jeawan Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 96 days.

(21) Appl. No.: 18/612,478

(22) Filed: Mar. 21, 2024

(65) Prior Publication Data

US 2025/0074148 A1 Mar. 6, 2025

(30) Foreign Application Priority Data

Sep. 6, 2023 (KR) ........................ 10-2023-0118415

(51) Int. Cl.
*B60H 1/00* (2006.01)

(52) U.S. Cl.
CPC ............................... *B60H 1/00899* (2013.01)

(58) Field of Classification Search
CPC .............................................. B60H 1/00899
See application file for complete search history.

(56) References Cited

U.S. PATENT DOCUMENTS

2020/0353795 A1* 11/2020 Choi .................. B60H 1/00278

FOREIGN PATENT DOCUMENTS

DE 102020117133 A1 * 12/2021

OTHER PUBLICATIONS

Dirk et al., Method for Operating a Refrigeration System of a Motor Vehicle . . . , Dec. 30, 2021, DE102020117133A1, Whole Document (Year: 2021).*

* cited by examiner

*Primary Examiner* — Larry L Furdge
(74) *Attorney, Agent, or Firm* — Lempia Summerfield Katz LLC

(57) ABSTRACT

A heat pump system for a vehicle includes an air conditioner unit comprising a compressor, a first heat-exchanger, a second heat-exchanger, a first expansion valve, and a third heat-exchanger that are connected through a refrigerant line to circulate a refrigerant through the refrigerant line; and a chiller connected to the refrigerant line through a first connection line, and configured to adjust the temperature of a coolant by heat-exchanging the refrigerant supplied from the air conditioner unit with the coolant. The air conditioner unit includes a first valve provided in the refrigerant line between the first heat-exchanger and the second heat-exchanger; a second valve provided in the refrigerant line between the third heat-exchanger and the compressor; a second expansion valve provided in the first connection line; a second connection line; and a third expansion valve provided in the second connection line.

20 Claims, 4 Drawing Sheets

1

HEAT PUMP SYSTEM FOR A VEHICLE

CROSS-REFERENCE TO RELATED APPLICATION

This application claims priority to and the benefit of Korean Patent Application No. 10-2023-0118415 filed in the Korean Intellectual Property Office on Sep. 6, 2023, the entire contents of which is incorporated herein by reference.

BACKGROUND

(a) Field of the Disclosure

The present disclosure relates to a heat pump system for a vehicle. More particularly, the present disclosure relates to a heat pump system for a vehicle capable of performing cooling or heating of a vehicle interior by using natural refrigerant, and efficiently adjusting the temperature of a battery module by using a single chiller where refrigerant and coolant heat-exchanges.

(b) Description of the Related Art

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

In other words, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

An environment-friendly technology of a vehicle is a core technology of a future automobile industry, and advanced car makers have focused their energy on the development of an environmentally-friendly vehicle to achieve environmental and fuel efficiency regulations.

Recently, in accordance with a continuous increase in interest in energy efficiency and an environmental pollution problem, the development of an environmentally-friendly vehicle capable of substantially substituting an internal combustion engine vehicle is required. The environmentally-friendly vehicle is classified into an electric vehicle driven using a fuel cell or electricity as a power source and a hybrid vehicle driven using an engine and a battery.

The electric vehicle is in the spotlight as a means of transportation in the future to solve environmental problems and energy resource problems.

A heat pump system, which is an air conditioner apparatus for regulating the temperature of the vehicle interior, is applied to such an electric vehicle.

However, the refrigerant that is conventionally used in the heat pump system contains a large amount of environmentally regulated material, e.g., PFAS (Per- and Polyfluoroalkyl Substances), and therefore, there is a demand for the development of a system capable of controlling the temperature of the vehicle interior by using new refrigerants, without PFAS or flammability, or natural refrigerants.

The above information disclosed in this Background section is only for improvement of understanding of the background of the disclosure, and therefore it may contain information that does not form the prior art that is already known in this country to a person of ordinary skill in the art.

SUMMARY

The present disclosure attempts to provide a heat pump system for a vehicle capable of performing cooling or heating of a vehicle interior by using natural refrigerant, and efficiently adjusting the temperature of a battery module by using a single chiller where refrigerant and coolant heat-exchanges, to respond to environmental regulations.

In addition, the present disclosure attempts to provide a heat pump system for a vehicle capable of maximizing cooling and heating performance by operating in a super-critical cycle that is a state in which pressure and temperature of the refrigerant are higher than a threshold pressure and temperature by applying the R744 refrigerant that is a natural refrigerant using carbon dioxide.

A heat pump system for a vehicle may include an air conditioner unit including a compressor, a first heat-exchanger, a second heat-exchanger, a first expansion valve, and a third heat-exchanger that are connected through a refrigerant line to circulate a refrigerant through the refrigerant line, and a chiller connected to the refrigerant line through a first connection line. The chiller is configured to adjust the temperature of the coolant by heat-exchanging the refrigerant supplied from the air conditioner unit with a coolant. The air conditioner unit may further include a first valve provided in the refrigerant line between the first heat-exchanger and the second heat-exchanger, a second valve provided in the refrigerant line between the third heat-exchanger and the compressor, a second expansion valve provided in the first connection line, a second connection line having a first end connected to the refrigerant line between the first heat-exchanger and the second heat-exchanger, and a second end connected to the refrigerant line between the second heat-exchanger and the third heat-exchanger, and a third expansion valve provided in the second connection line.

The air conditioner unit may further include: a third connection line having a first end connected to the refrigerant line between the compressor and the first heat-exchanger, and a second end connected to the refrigerant line between the first heat-exchanger and the second heat-exchanger; a third valve provided in the third connection line; a fourth connection line having a first end connected to the refrigerant line between the second heat-exchanger and the third heat-exchanger, and a second end connected to the refrigerant line between the third heat-exchanger and the compressor; a fourth expansion valve provided in the fourth connection line; a fifth connection line having a first end connected to the refrigerant line between the third heat-exchanger and the compressor, and a second end connected to the refrigerant line between the first heat-exchanger and the second heat-exchanger; and a fourth valve provided in the fifth connection line.

The air conditioner unit may further include an accumulator provided in the refrigerant line between the third heat-exchanger and the compressor, and an internal heat-exchanger provided inside the accumulator, and configured to heat-exchange the refrigerant supplied from the second heat-exchanger and the refrigerant supplied from the third heat-exchanger with each other, and to supply a liquid refrigerant among the heat-exchanged refrigerant to the third heat-exchanger.

In a heating mode of a vehicle interior, a portion of the refrigerant line connecting a first end of the first connection line to the second end of the second connection line may be closed by an operation of the first expansion valve. A portion of the refrigerant line connecting the first end of the second connection line and the second end of the fifth connection line may be closed by an operation of the first valve. A portion of the refrigerant line connecting a second end of the fourth connection line and a second end of the first connection line may be closed by an operation of the second valve. The first connection line may be opened by an operation of the second expansion valve. The second connection line may be opened by an operation of the third expansion valve. The third connection line may be closed by an operation of the third valve. The fourth connection line may be opened by an operation of the fourth expansion valve. The fifth connection line may be opened by an operation of the fourth valve.

The fourth expansion valve may be configured to expand the refrigerant such that the expanded refrigerant is supplied to the second heat-exchanger, the internal heat-exchanger, and the chiller, respectively.

A partial refrigerant among the refrigerant flowing from the third heat-exchanger into the fourth connection line may flow into the second heat-exchanger, and a remaining refrigerant among the refrigerant flowing from the third heat-exchanger into the fourth connection line may flow into the internal heat-exchanger.

A partial refrigerant among the refrigerant discharged from the fourth expansion valve may pass through the internal heat-exchanger along the refrigerant line, and then may flow into the chiller. The refrigerant discharged from the second heat-exchanger and the chiller may pass through the internal heat-exchanger and the accumulator, and then may be supplied to the compressor.

The second expansion valve may supply the refrigerant introduced through the first connection line to the chiller without expansion, and the third expansion valve may supply the refrigerant introduced through the second connection line to the third heat-exchanger without expansion.

In a heating and dehumidifying mode of a vehicle interior, a portion of the refrigerant line connecting a first end of the first connection line and the second end of the second connection line may be opened by an operation of the first expansion valve. A portion of the refrigerant line connecting the first end of the second connection line and the second heat-exchanger may be closed by an operation of the first valve. The refrigerant line connecting the third heat-exchanger and the accumulator may be opened by an operation of the second valve. The refrigerant line connecting the second heat-exchanger and the internal heat-exchanger is closed. The first connection line may be opened by an operation of the second expansion valve. The second connection line may be opened by an operation of the third expansion valve. The third connection line may be closed by an operation of the third valve. The fourth connection line may be closed by an operation of the fourth expansion valve. The fifth connection line may be closed by an operation of the fourth valve.

The third expansion valve may be configured to expand the refrigerant introduced through the second connection line from the first heat-exchanger, and to supply the expanded refrigerant to the third heat-exchanger and the chiller, respectively.

The first expansion valve and the second expansion valve may be configured to flow the introduced refrigerant without expansion.

When cooling of a battery module is required in a cooling mode of a vehicle interior, a portion of the refrigerant line connecting the compressor and the first heat-exchanger and a portion of the refrigerant line connecting the first heat-exchanger and the second heat-exchanger may be closed by an operation of the first valve. The first connection line may be opened by an operation of the second expansion valve. The second connection line may be closed by an operation of the third expansion valve. The third connection line may be opened by an operation of the third valve. The fourth connection line may be closed by an operation of the fourth expansion valve. The fifth connection line may be closed by an operation of the fourth valve.

The first expansion valve may be configured to expand the refrigerant introduced through the refrigerant line and flow the expanded refrigerant to the third heat-exchanger. The second expansion valve may be configured to expand the refrigerant introduced into the first connection line and flow the expanded refrigerant to the chiller so as to cool the battery module by using the coolant heat-exchanged with the refrigerant in the chiller.

The refrigerant discharged from the compressor may flow into the second heat-exchanger along the third connection line. A partial refrigerant among the refrigerant discharged from the internal heat-exchanger may flow into the chiller along the first connection line. A remaining refrigerant among the refrigerant discharged from the internal heat-exchanger may flow into the first expansion valve along the refrigerant line. The refrigerant discharged from the chiller and the refrigerant discharged from the third heat-exchanger may pass through the internal heat-exchanger and the accumulator along the refrigerant line, and then may be supplied to the compressor.

The second heat-exchanger and the third heat-exchanger may be configured to cool or evaporate an interiorly introduced refrigerant.

A first end of the first connection line may be connected to the refrigerant line between the second heat-exchanger and the first expansion valve, and a second end of the first connection line may be connected to the refrigerant line between the third heat-exchanger and the compressor.

The refrigerant may be R744 refrigerant formed of carbon dioxide.

The chiller may be connected to an electrical component and a battery module through a first line and a second line circulating the coolant, respectively.

The first heat-exchanger, the second heat-exchanger, and the third heat-exchanger may be air-cooled gas coolers configured to heat-exchange an interiorly introduced refrigerant with air. The chiller may be a water-cooled gas cooler configured to heat-exchange the interiorly introduced refrigerant with the coolant.

The first expansion valve, the second expansion valve, the third expansion valve, and the fourth expansion valve may be electronic expansion valves configured to selectively expand the refrigerant while controlling flow movement of the refrigerant.

The first valve, the second valve, the third valve, and the fourth valve may be 2-way valves.

As described above, by employing a heat pump system for a vehicle according to an embodiment, as cooling or heating of the vehicle interior is performed by using the natural refrigerant, it is possible to cope with environmental regulations and improve the overall marketability of the vehicle.

In addition, according to the disclosure, by applying the R744 refrigerant that is a natural refrigerant using carbon dioxide, cooling and heating performance may be maximized by being operated in a super-critical region that is a state in which pressure and temperature of the refrigerant are higher than a threshold pressure and temperature, for cooling and heating of the vehicle interior.

In addition, according to the disclosure, streamlining and simplification of the system may be achieved by efficiently adjusting the temperature of the battery module by using the single chiller that heat-exchanges the coolant and the refrigerant according to the mode of the vehicle.

In addition, according to an embodiment, by efficiently adjusting the temperature of the battery module, the optimal performance of the battery module may be enabled, and the overall travel distance of the vehicle may be increased due to the efficient management of the battery module.

In addition, in the heating mode of the vehicle interior, according to the disclosure, since the refrigerant is expanded and branched to be supplied to each heat-exchanger, it becomes easy to control the flow of the refrigerant, the ambient air heat and the waste heat of the electrical components may be smoothly recollected, and at the same time, a chiller for cooling the battery module may be optimally designed.

In addition, according to an embodiment, it is possible to reduce manufacturing cost and weight through simplification of an entire system, and to improve space utilization.

DETAILED DESCRIPTION

Figure 1:
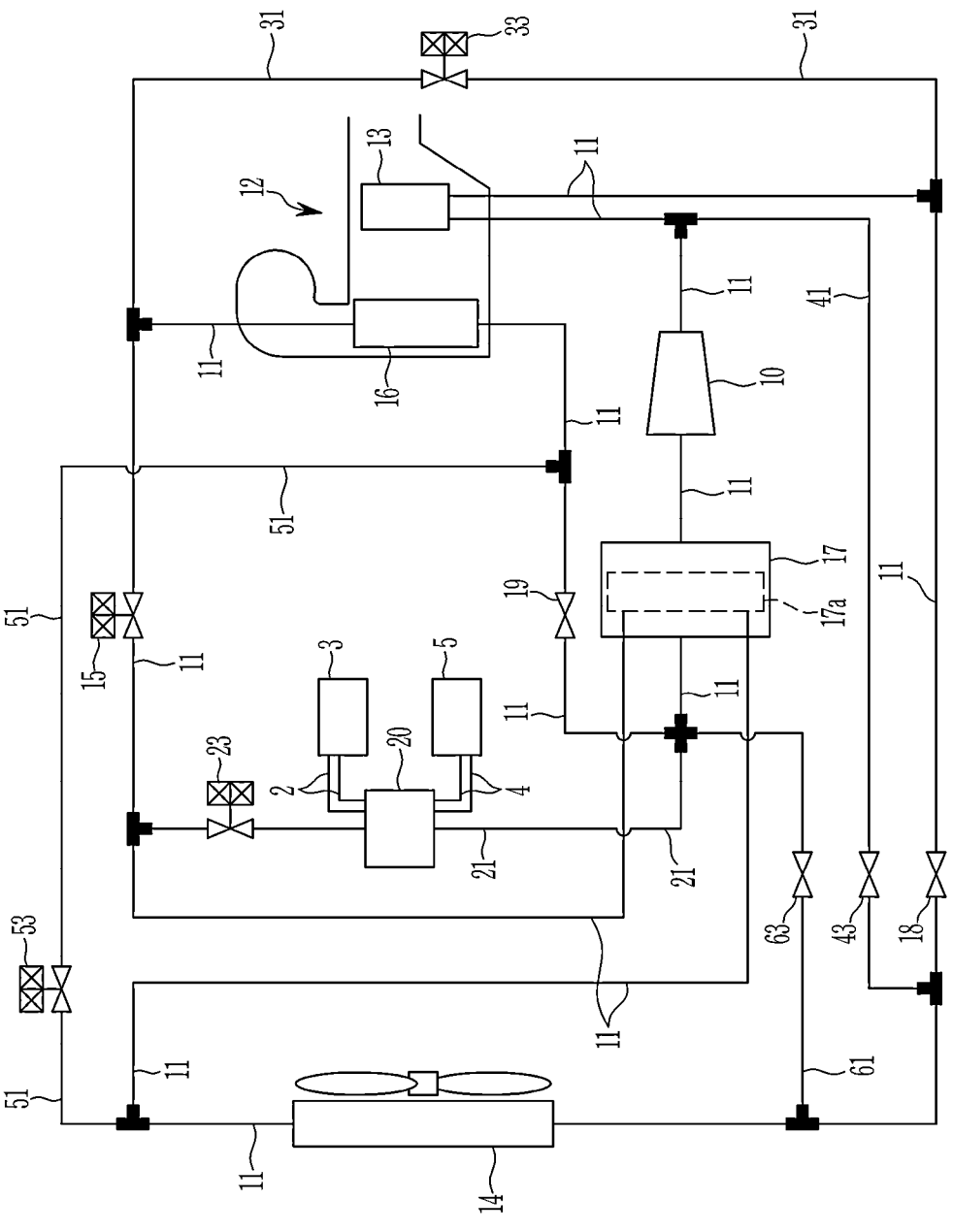
FIG. 1 is a block diagram of a heat pump system for a vehicle according to an embodiment.

An embodiment will hereinafter be described in detail with reference to the accompanying drawings.

Embodiments disclosed in the present specification and the constructions depicted in the drawings are only representative embodiments of the present disclosure, and do not cover the entire scope of the present disclosure. Therefore, it is understood that there may be various equivalents and variations at the time of the application of this specification.

In order to clarify the present disclosure, parts that are not related to the description are omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, and the like, are exaggerated for clarity.

In addition, unless explicitly described to the contrary, the word "comprise" and variations such as "comprises" or "comprising", are understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

FIG. 1 is a block diagram of a heat pump system of a vehicle according to an embodiment.

A heat pump system for a vehicle according to an embodiment may perform cooling or heating of a vehicle interior by using natural refrigerant and efficiently adjusting a temperature of a battery module 5 by using a single chiller 20 that heat-exchanges the refrigerant and a coolant, so as to respond to environmental regulations.

The refrigerant may be an R744 refrigerant formed of carbon dioxide, of which the ozone depletion potential (ODP) is 0 and the global warming potential (GWP) is 1.

In other words, by applying the R744 refrigerant that is a natural refrigerant using carbon dioxide, a heat pump system for a vehicle according to an embodiment may maximize cooling and heating performance, by being operated in a super-critical cycle that is a state in which pressure and temperature of the refrigerant are higher than a threshold pressure and temperature.

For such a purpose, the heat pump system according to an embodiment may include an air conditioner unit and the chiller 20.

Referring to FIG. 1, the air conditioner unit may include a compressor 10, a first heat-exchanger 13, a second heat-exchanger 14, a third heat-exchanger 16, an accumulator 17, and an internal heat-exchanger 17a that are connected to each other through a refrigerant line 11 to circulate the refrigerant through the refrigerant line 11.

First, the compressor 10 may compress the introduced refrigerant and flow the compressed refrigerant to the refrigerant line 11 such that the refrigerant may circulate along the refrigerant line 11.

The first heat-exchanger 13 may heat-exchange the refrigerant selectively supplied from the compressor 10 with the air.

The second heat-exchanger 14 may be connected to the first heat-exchanger 13 through the refrigerant line 11. Accordingly, the refrigerant supplied to the refrigerant line 11 may pass through the second heat-exchanger 14.

The second heat-exchanger 14 may be disposed in a frontal side of the vehicle and may cool or evaporate the refrigerant through heat-exchange with the air introduced from the outside during driving of the vehicle.

Since the R744 refrigerant is a super-critical refrigerant and different from other refrigerants in that it does not have a phase-change, it is referred to as a gas cooling refrigerant rather than a condensation refrigerant.

In the present embodiment, the first expansion valve 15 may be provided in the refrigerant line 11 between the second heat-exchanger 14 and the third heat-exchanger 16. The first expansion valve 15 may selectively expand the refrigerant introduced through the refrigerant line 11.

In addition, the third heat-exchanger 16 may be provided in the refrigerant line 11 between the first expansion valve 15 and the compressor 10.

The first heat-exchanger 13 and the third heat-exchanger 16 may be provided in an interior of a heating, ventilation, and air conditioning (HVAC) module 12.

Accordingly, the third heat-exchanger 16 may cool or evaporate the refrigerant through heat-exchange with the air introduced to the HVAC module 12.

In other words, the first heat-exchanger 13, the second heat-exchanger 14, and the third heat-exchanger 16 may be an air-cooled gas cooler configured to heat-exchange the interiorly introduced refrigerant with air.

The second heat-exchanger 14 and the third heat-exchanger 16 may evaporate the refrigerant when the expanded refrigerant is introduced and cool the refrigerant when the unexpanded refrigerant is introduced.

In the present embodiment, the accumulator 17 may be provided in the refrigerant line 11 between the third heat-exchanger 16 and the compressor 10.

The accumulator 17 only supplies gaseous refrigerant to the compressor 10, thereby improving efficiency and durability of the compressor 10.

In addition, the internal heat-exchanger 17a may be provided inside the accumulator 17. The internal heat-exchanger 17a may heat-exchange the refrigerant supplied from the second heat-exchanger 14 and the refrigerant supplied from the third heat-exchanger 16 with each other, and may supply a liquid refrigerant among the heat-exchanged refrigerant to the third heat-exchanger 16.

In other words, the internal heat-exchanger 17a may heat-exchange the refrigerant cooled from the second heat-exchanger 14 with the low temperature refrigerant discharged from the third heat-exchanger 16 and may supply the heat-exchanged refrigerant to the compressor 10 and the third heat-exchanger 16, respectively.

In the present embodiment, the chiller 20 may be connected to an electrical component 3 through a first line 2 through which the coolant circulates.

The electrical component 3 may include an electric power control unit (EPCU), a power conversion device such as a motor, an inverter, an on-board charger (OBC), or the like, and an autonomous driving controller, or the like.

The electrical component 3 configured as such may be water-cooled by being connected to the first line 2.

The chiller 20 may adjust a temperature of the electrical component 3 by using the coolant heat-exchanged with the refrigerant and may recollect a waste heat of the electrical component 3.

In addition, the chiller 20 may be connected to the battery module 5 through a second line 4 through which the coolant circulates. Accordingly, the coolant may selectively circulate through an interior of the chiller 20.

The chiller 20 may heat-exchange the refrigerant supplied from the air conditioner unit with the coolant, and thereby adjust the temperature of the coolant. In other words, the chiller 20 may be a water-cooled gas cooler configured to heat-exchange the interiorly introduced refrigerant with the coolant.

The chiller 20 may be connected to the refrigerant line 11 through a first connection line 21.

A first end of the first connection line 21 may be connected to the refrigerant line 11 between the second heat-exchanger 14 and the first expansion valve 15. In addition, a second end of the first connection line 21 may be connected to the refrigerant line 11 between the third heat-exchanger 16 and the accumulator 17.

In other words, the chiller 20 may heat-exchange the coolant selectively introduced through the first line 2 or the second line 4 with the refrigerant selectively supplied from the air conditioner unit, to adjust the temperature of the coolant.

Accordingly, the coolant having heat-exchanged in the chiller 20 may circulate through the electrical component 3 through the first line 2. In addition, the coolant having heat-exchanged in the chiller 20 may circulate through the battery module 5 through the second line 4.

A water pump (not shown) may be provided in the first line 2 and the second line 4.

In other words, the coolant may circulate the first line 2 and the second line 4 according to an operation of each water pump (not shown).

Accordingly, the coolant heat-exchanged with the refrigerant in the chiller 20 may be selectively supplied to the electrical component 3 and the battery module 5, and thereby adjust the temperature of the electrical component 3 and the battery module 5.

In the present embodiment, the air conditioner unit may further include a first valve 18, a second valve 19, a second expansion valve 23, a second connection line 31, a third expansion valve 33, a third connection line 41, a third valve 43, a fourth connection line 51, a fourth expansion valve 53, a fifth connection line 61, and a fourth valve 63.

The first valve 18 may be provided in the refrigerant line 11 between the first heat-exchanger 13 and the second heat-exchanger 14.

The first valve 18 may selectively open and close the refrigerant line 11 such that the refrigerant discharged from the first heat-exchanger 13 may be selectively introduced into the second heat-exchanger 14.

In the present embodiment, the second valve 19 may be provided in the refrigerant line 11 between the third heat-exchanger 16 and the compressor 10. In more detail, the second valve 19 may be provided in the refrigerant line 11 between the third heat-exchanger 16 and the accumulator 17.

The second valve 19 may open the refrigerant line 11 such that the refrigerant discharged from the third heat-exchanger 16 may flow into the accumulator 17. To the contrary, the second valve 19 may close the refrigerant line 11 such that the refrigerant discharged from the third heat-exchanger 16 may not flow into the accumulator 17.

In other words, in the case of a heating mode of the vehicle interior, the second valve 19 may close the refrigerant line 11 such that the refrigerant discharged from the third heat-exchanger 16 may not flow into the accumulator 17.

On the other hand, in a cooling mode of the vehicle interior or a heating and dehumidifying mode of the vehicle interior, the second valve 19 may open the refrigerant line 11 such that the refrigerant discharged from the third heat-exchanger 16 may flow into the accumulator 17.

The second expansion valve 23 may be provided in the first connection line 21.

Depending on the cooling mode or the heating mode of the vehicle interior, the second expansion valve 23 may selectively expand the refrigerant introduced into the first connection line 21 and flow the selectively expanded refrigerant to the chiller 20.

In addition, the second expansion valve 23 may supply the refrigerant introduced into the first connection line 21 to the chiller 20 without expansion, or may close the first connection line 21 such that the refrigerant may not be supplied to the chiller 20.

In more detail, when cooling the battery module 5 by using the coolant heat-exchanged with the refrigerant in the chiller 20, the second expansion valve 23 may open the first connection line 21. At the same time, the second expansion valve 23 may expand the refrigerant introduced into the first connection line 21 and flow the expanded refrigerant to the chiller 20.

In other words, the second expansion valve 23 may expand the refrigerant discharged from the second heat-exchanger 14 to lower the temperature and flow the expanded refrigerant to the chiller 20, and thereby, the temperature of the coolant passing through the interior of the chiller 20 may be further lowered.

Accordingly, the battery module 5 may be more efficiently cooled, by flowing the coolant having the lowered temperature while passing through the chiller 20.

In the present embodiment, a first end of the second connection line 31 may be connected to the refrigerant line 11 between the first heat-exchanger 13 and the second heat-exchanger 14. A second end of the second connection line 31 may be connected to the refrigerant line 11 between the second heat-exchanger 14 and the third heat-exchanger 16.

The third expansion valve 33 may be provided in the second connection line 31. The third expansion valve 33 may selectively open and close the second connection line 31, and may selectively expand the refrigerant introduced into the second connection line 31.

In the case of the cooling mode of the vehicle interior, the third expansion valve 33 may close the second connection line 31. On the other hand, in the case of the heating mode of the vehicle interior, the third expansion valve 33 may open the second connection line 31.

In addition, in the case of the heating and dehumidifying mode of the vehicle interior, the third expansion valve 33 may open the second connection line 31, and may expand the refrigerant introduced into the second connection line 31.

In other words, the third expansion valve 33 may selectively expand the refrigerant while controlling flow movement of the refrigerant.

In the present embodiment, a first end of the third connection line 41 may be connected to the refrigerant line 11 between the compressor 10 and the first heat-exchanger 13. A second end of the third connection line 41 may be connected to the refrigerant line 11 between the first heat-exchanger 13 and the second heat-exchanger 14.

The third valve 43 may be provided in the third connection line 41. The third valve 43 may selectively open and close the third connection line 41. In other words, in the case of the cooling mode of the vehicle interior, the third valve 43 may open the third connection line 41. On the other hand, in the case of the heating mode of the vehicle interior and the heating and dehumidifying mode of the vehicle interior, the third valve 43 may close the third connection line 41.

A first end of the fourth connection line 51 may be connected to the refrigerant line 11 between the second heat-exchanger 14 and the third heat-exchanger 16. A second end of the fourth connection line 51 may be connected to the refrigerant line 11 between the third heat-exchanger 16 and the accumulator 17.

The fourth expansion valve 53 may be provided in the fourth connection line 51.

The fourth expansion valve 53 may control flowing of the refrigerant by selectively open and close the fourth connection line 51 and may selectively expand the refrigerant introduced into the fourth connection line 51.

In other words, in the heating mode of the vehicle interior, the fourth expansion valve 53 may open the fourth connection line 51 and may expand the refrigerant introduced into the fourth connection line 51 and supply the expanded refrigerant to the second heat-exchanger 14 and the internal heat-exchanger 17a, respectively.

Accordingly, in the heating mode of the vehicle interior, the second heat-exchanger 14 may evaporate the refrigerant through heat-exchange with the air introduced from the outside.

The refrigerant having passed through the internal heat-exchanger 17a may be supplied to the chiller 20. The chiller 20 may evaporate the refrigerant through heat-exchange with the coolant supplied through the first line 2.

To the contrary, in the cooling mode of the vehicle interior or the heating and dehumidifying mode of the vehicle interior, the fourth expansion valve 53 may close the fourth connection line 51.

In the present embodiment, a first end of the fifth connection line 61 may be connected to the refrigerant line 11 between the third heat-exchanger 16 and the compressor 10. A second end of the fifth connection line 61 may be connected to the refrigerant line 11 between the first heat-exchanger 13 and the second heat-exchanger 14.

In addition, the fourth valve 63 may be provided in the fifth connection line 61. The fourth valve 63 may control flow of the refrigerant by selectively opening and closing the fifth connection line 61.

In the case of the cooling mode of the vehicle interior or the heating and dehumidifying mode of the vehicle interior, the fourth valve 63 may close the fifth connection line 61. To the contrary, in the case of the heating mode of the vehicle interior, the fourth valve 63 may open the fifth connection line 61.

The first valve 18, the second valve 19, the third valve 43, and the fourth valve 63 may each be a 2-Way valve that controls opening and closing of the refrigerant line 11, the third connection line 41, and the fifth connection line 61.

In addition, the first expansion valve 15, the second expansion valve 23, the third expansion valve 33, and the fourth expansion valve 53 may each be an electronic expansion valve that selectively expands the refrigerant while controlling flow movement of the refrigerant.

Hereinafter, an operation and action of a heat pump system for a vehicle according to an embodiment configured as described above are described in detail with reference to FIGS. 2-4.

First, the operation in the heating mode of the vehicle interior is described with reference to FIG. 2.

Figure 2:
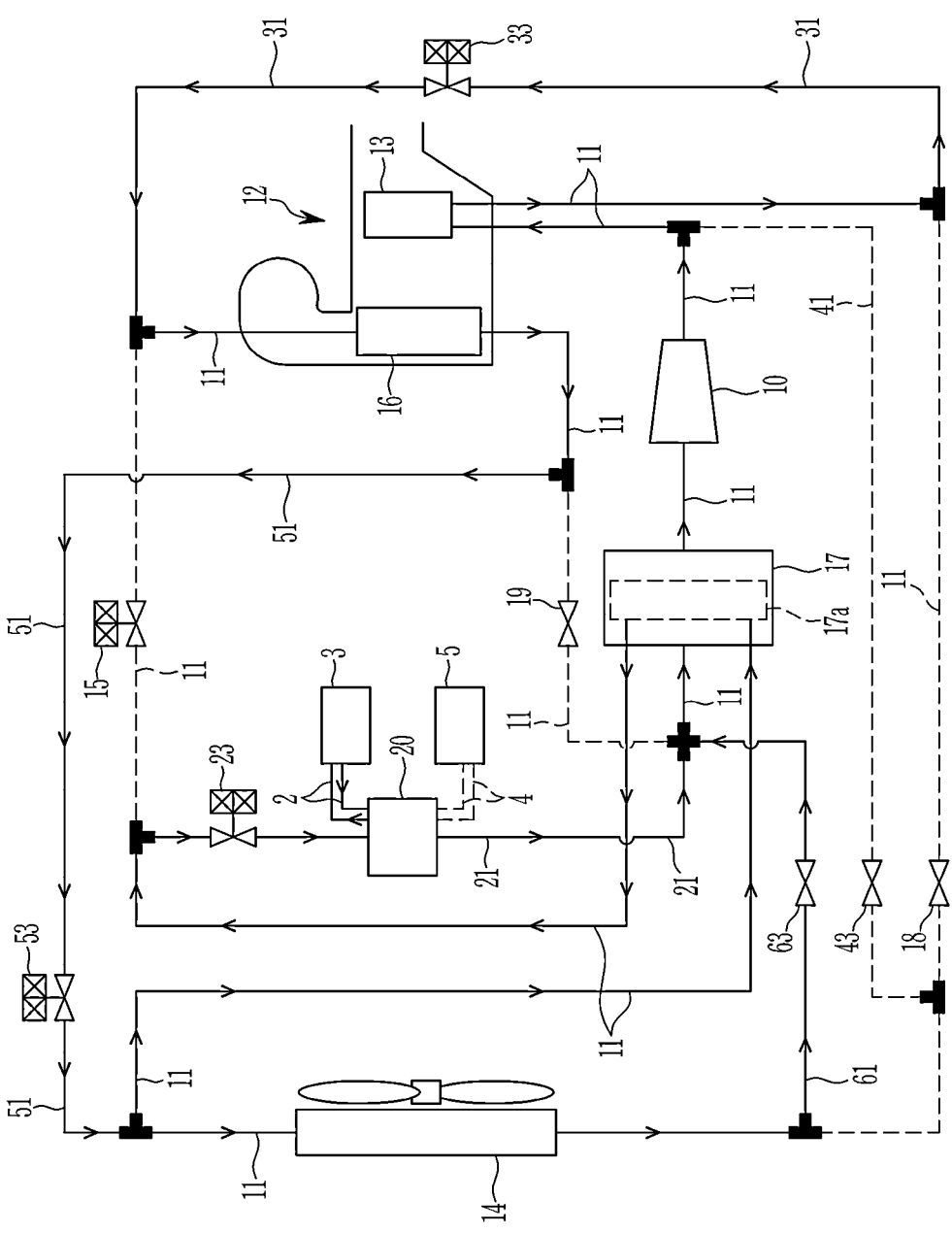
FIG. 2 is an operation diagram of a heat pump system for a vehicle according to an embodiment, in a heating mode of the vehicle interior.

FIG. 2 is an operation diagram of a heat pump system for a vehicle according to an embodiment, in the heating mode of the vehicle interior.

Referring to FIG. 2, the coolant may circulate through the first line 2 by an operation of a water pump (not shown).

Accordingly, the coolant having passed through the electrical component 3 may be supplied to the chiller 20 along the first line 2.

Respective components in the air conditioner unit may operate for heating of the vehicle interior. Accordingly, the refrigerant may circulate along the refrigerant line 11.

A portion of the refrigerant line 11 connecting the first end of the first connection line 21 to the second end of the second connection line 31 may be closed by an operation of the first expansion valve 15.

A portion of the refrigerant line 11 connecting the first end of the second connection line 31 and the second end of the fifth connection line 61 may be closed by an operation of the first valve 18.

In addition, a portion of the refrigerant line 11 connecting the second end of the fourth connection line 51 and the second end of the first connection line 21 may be closed by an operation of the second valve 19.

Simultaneously, the first connection line 21 may be opened by an operation of the second expansion valve 23. The second expansion valve 23 may supply the refrigerant introduced through the first connection line 21 to the chiller 20 without expansion.

The second connection line 31 may be opened by an operation of the third expansion valve 33. The third expansion valve 33 may supply the refrigerant introduced through the second connection line 31 to the third heat-exchanger 16 without expansion.

Accordingly, the first heat-exchanger 13 and the third heat-exchanger 16 may cool the refrigerant by using the air introduced into the HVAC module 12.

In the present embodiment, the third connection line 41 may be closed by an operation of the third valve 43. The fourth connection line 51 may be opened by an operation of the fourth expansion valve 53.

Accordingly, a partial refrigerant among the refrigerant flowing from the third heat-exchanger 16 into the fourth connection line 51 may flow into the second heat-exchanger 14.

Simultaneously, a remaining refrigerant among the refrigerant flowing from the third heat-exchanger 16 into the fourth connection line 51 may flow into the internal heat-exchanger 17a along the refrigerant line 11.

The fourth expansion valve 53 may expand the refrigerant such that the expanded refrigerant is supplied to the second heat-exchanger 14, the internal heat-exchanger 17a, and the chiller 20, respectively.

Accordingly, the second heat-exchanger 14 may evaporate the expanded refrigerant through heat-exchange with the air introduced from the outside. The second heat-exchanger 14 may recollect the ambient air heat while evaporating the expanded refrigerant through heat-exchange with the air.

In addition, the chiller 20 may evaporate the expanded refrigerant through heat-exchange with the coolant supplied through the first line 2. The chiller 20 may recollect the waste heat of the electrical component 3 from the coolant heated by recollecting waste heat from the electrical component 3.

In addition, the fifth connection line 61 may be opened by an operation of the fourth valve 63.

Accordingly, the refrigerant discharged from the second heat-exchanger 14 may flow along the fifth connection line 61, and the refrigerant discharged from the chiller 20 may flow along the first connection line 21.

The refrigerants that flow through the first connection line 21 and the fifth connection line 61 may pass through the internal heat-exchanger 17a and the accumulator 17 along the refrigerant line 11, and then be supplied to the compressor 10.

In other words, a partial refrigerant among the refrigerant expanded from the fourth expansion valve 53 may pass through the internal heat-exchanger 17a along the refrigerant line 11, and then flow into the chiller 20.

In addition, the refrigerant discharged from the second heat-exchanger 14 and the chiller 20 may pass through the internal heat-exchanger 17a and the accumulator 17, and then be supplied to the compressor 10.

In such a state, the refrigerant supplied from the compressor 10 may flow into the first heat-exchanger 13 along the refrigerant line 11. The refrigerant having passed through the first heat-exchanger 13 may flow along the second connection line 31 connected to the refrigerant line 11.

The refrigerant flowing along the second connection line 31 may flow into the third heat-exchanger 16 along the refrigerant line 11 connected to the third heat-exchanger 16.

The first heat-exchanger 13 and the third heat-exchanger 16 may cool the refrigerant by heat-exchanging the refrigerant with the air introduced into the HVAC module 12. The refrigerant primarily cooled in the first heat-exchanger 13 may be additionally cooled in the third heat-exchanger 16.

In other words, when the refrigerant having passed through the first heat-exchanger 13 is supplied to the third heat-exchanger 16 without being expanded by the operation of the third expansion valve 33, the third heat-exchanger 16 may cool the refrigerant by heat-exchanging the refrigerant with the air introduced into the HVAC module 12.

The refrigerant having passed through the third heat-exchanger 16 may flow along the opened fourth connection line 51. The refrigerant introduced into the fourth connection line 51 may be expanded by the operation of the fourth expansion valve 53.

A partial refrigerant among the refrigerant expanded from the fourth expansion valve 53 may flow along the refrigerant line 11 connected to the internal heat-exchanger 17a and flow into the internal heat-exchanger 17a.

The refrigerant having passed through the internal heat-exchanger 17a may pass through the chiller 20 along the refrigerant line 11 and the first connection line 21, and then pass through the internal heat-exchanger 17a and the accumulator 17.

A remaining refrigerant among the refrigerant expanded by the fourth expansion valve 53 may pass through the second heat-exchanger 14 and then flow along the fifth connection line 61. The refrigerant introduced into the fifth connection line 61 may pass through the internal heat-exchanger 17a and the accumulator 17, together with the refrigerant having passed through the chiller 20.

Accordingly, the second heat-exchanger 14 may cool the supplied refrigerant through heat-exchange with the air, and at the same time, the chiller 20 may cool the supplied refrigerant through heat-exchange with the coolant. While repeatedly performing such an operation, the second heat-exchanger 14 and the chiller 20 may recollect the waste heat of the electrical component 3 and the ambient air heat.

In other words, since the recollected waste heat of the electrical component 3 and the ambient air heat are used for increasing the temperature of the refrigerant, the heat pump system may reduce the power consumption of the compressor 10 and improve the heating efficiency.

The refrigerant having passed through the accumulator 17 may be supplied to the compressor 10.

In addition, the refrigerant compressed by the compressor 10 to a high-temperature and high-pressure state may be introduced back into the first heat-exchanger 13 along the refrigerant line 11.

As described above, the refrigerant supplied to the first heat-exchanger 13 and the third heat-exchanger 16, respectively, may increase the temperature of the air introduced into the HVAC module 12.

Accordingly, the air introduced from the outside may be converted to a high-temperature state while sequentially passing through the third heat-exchanger 16 and the first heat-exchanger 13, and flow into the vehicle interior, thereby achieving the heating of the vehicle interior.

In the present embodiment, the operation in the heating and dehumidifying mode of the vehicle interior is described with reference to FIG. 3.

Figure 3:
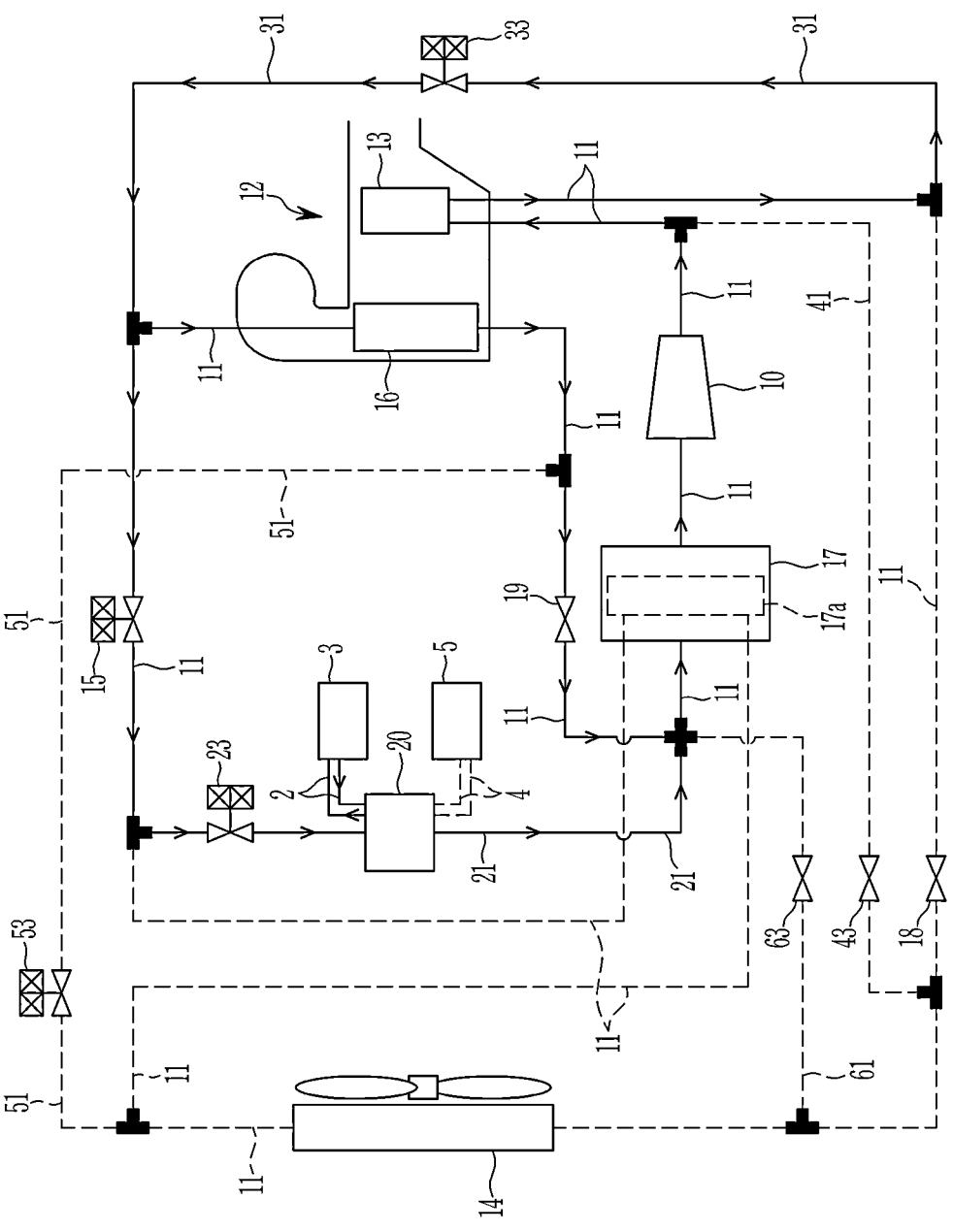
FIG. 3 is an operation diagram of a heat pump system for a vehicle according to an embodiment, in a heating and dehumidifying mode of the vehicle interior.

FIG. 3 is an operation diagram of a heat pump system for a vehicle according to an embodiment, in the heating and dehumidifying mode of the vehicle interior.

Referring to FIG. 3, respective components in the air conditioner unit may operate for heat and dehumidification of the vehicle interior. Accordingly, the refrigerant may circulate along the refrigerant line 11.

A portion of the refrigerant line 11 connecting the first end of the first connection line 21 and the second end of the second connection line 31 may be opened by the operation of the first expansion valve 15.

In addition, a portion of the refrigerant line 11 connecting the first end of the second connection line 31 and the second heat-exchanger 14 may be closed by the operation of the first valve 18.

The refrigerant line 11 connecting the third heat-exchanger 16 and the accumulator 17 may be opened by the operation of the second valve 19. In addition, the refrigerant line 11 connecting the second heat-exchanger 14 and the internal heat-exchanger 17a may be closed.

The first connection line 21 may be opened by the operation of the second expansion valve 23. The second connection line 31 may be opened by the operation of the third expansion valve 33.

The third expansion valve 33 may expand the refrigerant introduced through the second connection line 31 from the first heat-exchanger 13. Thereafter, the third expansion valve 33 may supply the expanded refrigerant to the third heat-exchanger 16 and the chiller 20, respectively.

Simultaneously, the first expansion valve 15 and the second expansion valve 23 may flow the introduced refrigerant without expansion through the refrigerant line 11 and the first connection line 21.

Accordingly, the first heat-exchanger 13 may cool the refrigerant by using the air introduced into the HVAC module 12.

The coolant may circulate through the first line 2 by an operation of a water pump (not shown). Accordingly, the coolant having passed through the electrical component 3 may be supplied to the chiller 20 along the first line 2.

Accordingly, the chiller 20 may evaporate the introduced refrigerant through heat-exchange with the coolant supplied through the first line 2. The chiller 20 may recollect the waste heat of the electrical component 3 from the coolant heated by recollecting waste heat from the electrical component 3.

In other words, since the recollected waste heat of the electrical component 3 is used to increase the temperature of the refrigerant, the heat pump system may reduce the power consumption of the compressor 10 and improve the heating efficiency.

Although not shown in the drawings, when a waste heat of the battery module 5 is also to be recollected together, the coolant may circulate through the second line 4 by an operation of a water pump (not shown). Accordingly, the coolant having passed through the battery module 5 may be supplied to the chiller 20 along the second line 4.

The present embodiment takes an example that the first connection line 21 is opened by the operation of the second expansion valve 23 such that the refrigerant may be introduced into the chiller 20, but is not limited thereto.

In other words, when the waste heat of the electrical component 3 or the battery module 5 does not need to be recollected through the chiller 20, the first connection line 21 may be closed. The coolant may not circulate through the first line 2 and the second line 4.

In the present embodiment, the third connection line 41 may be closed by the operation of the third valve 43. The fourth connection line 51 may be closed by the operation of the fourth expansion valve 53.

In addition, the fifth connection line 61 may be closed by the operation of the fourth valve 63.

Accordingly, the refrigerant discharged from the compressor 10, or the refrigerant discharged from the first heat-exchanger 13 may not flow into the second heat-exchanger 14.

In other words, the refrigerant discharged from the compressor 10 may flow into the first heat-exchanger 13 along the refrigerant line 11. The refrigerant having passed through the first heat exchanger 13 may flow along the second connection line 31 connected to the refrigerant line 11.

The refrigerant flowing through the second connection line 31 may be expanded by the operation of the third expansion valve 33. Thereafter, a partial refrigerant among the expanded refrigerant may flow into the third heat-exchanger 16.

A remaining refrigerant among the expanded refrigerant may flow into the chiller 20 through the first connection line 21.

Then, the refrigerant having passed through the chiller 20 and the refrigerant having passed through the third heat-exchanger 16 may pass through the internal heat-exchanger 17a and the accumulator 17 along the refrigerant line 11.

In addition, the refrigerant having passed through the accumulator 17 may be supplied to the compressor 10.

In addition, the refrigerant compressed by the compressor 10 to a high-temperature and high-pressure state may be introduced back into the first heat-exchanger 13 along the refrigerant line 11.

As described above, the refrigerant supplied to the first heat-exchanger 13 may increase the temperature of the air introduced into the HVAC module 12.

In other words, the air introduced into the HVAC module 12 may be dehumidified by the low-temperature refrigerant introduced into the third heat-exchanger 16 while passing through the third heat-exchanger 16. Thereafter, since the air is converted to a high-temperature state while passing through the first heat-exchanger 13 and then introduced into the vehicle interior, the vehicle interior may be smoothly heated and dehumidified.

In addition, the operation for cooling the battery module 5 in the cooling mode of the vehicle interior is described with reference to FIG. 4.

Figure 4:
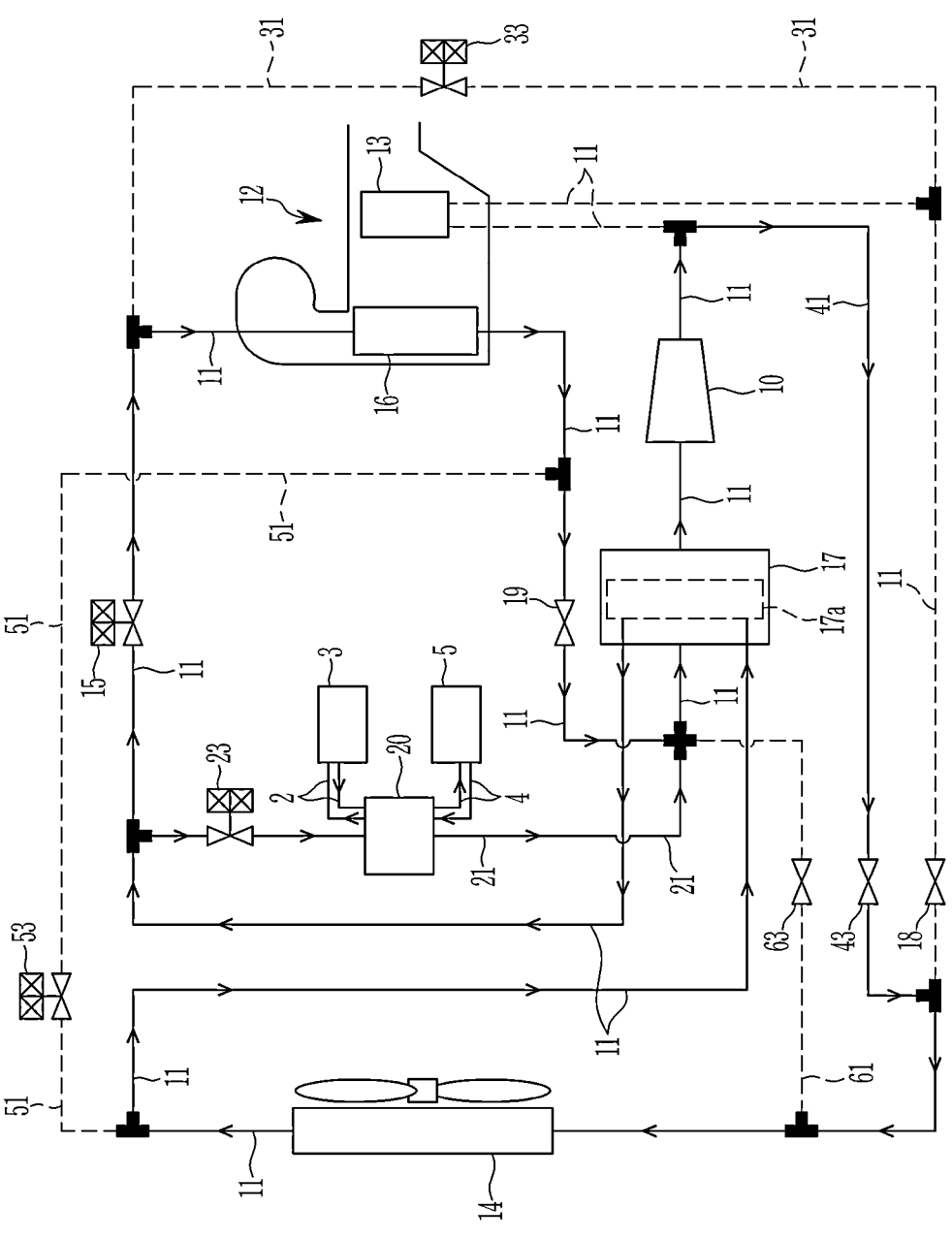
FIG. 4 is an operation diagram of a heat pump system for a vehicle according to an embodiment, for cooling a battery module in a cooling mode of the vehicle interior.

FIG. 4 is an operation diagram of a heat pump system for a vehicle according to an embodiment, for cooling a battery module in a cooling mode of the vehicle interior.

Referring to FIG. 4, the coolant may circulate through the first line 2 by an operation of a water pump (not shown). At the same time, the coolant may circulate through the second line 4 by an operation of a water pump (not shown).

In other words, the coolant having passed through the electrical component 3 may be supplied to the chiller 20 along the first line 2, and the coolant having passed through the battery module 5 may be supplied to the chiller 20 along the second line 4.

Respective components in the air conditioner unit may operate for cooling of the vehicle interior. Accordingly, the refrigerant may circulate along the refrigerant line 11.

A portion of the refrigerant line 11 connecting the compressor 10 and the first heat-exchanger 13 and a portion of the refrigerant line 11 connecting the first heat-exchanger 13 and the second heat-exchanger 14 may be closed by the operation of the first valve 18.

The first connection line 21 may be opened by the operation of the second expansion valve 23 for cooling of the electrical component 3 and the battery module 5.

Accordingly, the coolant having passed through the battery module 5 may be supplied to the chiller 20 along the second line 4.

The second expansion valve 23 may expand the refrigerant introduced into the first connection line 21 and flow the expanded refrigerant to the chiller 20 so as to cool the battery module 5 by using the coolant heat-exchanged with the refrigerant in the chiller 20.

Accordingly, the coolant having passed through the chiller 20 may be cooled through heat-exchange with the expanded refrigerant supplied to the chiller 20.

In other words, the coolant passing through the chiller 20 may be cooled through heat-exchange with the expanded refrigerant supplied to the chiller 20. The coolant cooled in the chiller 20 may be supplied to the battery module 5 along the second line 4. Accordingly, the battery module 5 may be efficiently cooled by the coolant cooled at the chiller 20.

The second connection line 31 may be closed by the operation of the third expansion valve 33. The third connection line 41 may be opened by the operation of the third valve 43.

In addition, the fourth connection line 51 may be closed by the operation of the fourth expansion valve 53. In addition, the fifth connection line 61 may be closed by the operation of the fourth valve 63.

Accordingly, the refrigerant discharged from the compressor 10 may flow along the third connection line 41, without passing through the first heat-exchanger 13.

In other words, the refrigerant discharged from the compressor 10 may flow along the third connection line 41 and may flow into the second heat-exchanger 14 along the refrigerant line 11 connected to the second heat-exchanger 14.

The second heat-exchanger 14 may primarily cool the refrigerant by using the air introduced from the outside.

The refrigerant discharged from the second heat-exchanger may flow into the internal heat-exchanger 17a along the refrigerant line 11. The internal heat-exchanger 17a may heat-exchange the refrigerant supplied from the second heat-exchanger 14 with the refrigerant each supplied from the third heat-exchanger 16 and the chiller 20, to achieve additionally cooling of the refrigerant supplied from the second heat-exchanger 14.

A partial refrigerant among the refrigerant discharged from the internal heat-exchanger 17a may flow into the chiller 20 along the first connection line 21.

The refrigerant introduced into the chiller 20 may be heat-exchanged with the coolant supplied through the second line 4, pass through the internal heat-exchanger 17a and the accumulator 17 through the refrigerant line 11 connected to the first connection line 21, and then flow into the compressor 10.

In addition, a remaining refrigerant among the refrigerant discharged from the internal heat-exchanger 17a may flow into the first expansion valve 15 along the refrigerant line 11 so as to cool the vehicle interior.

The first expansion valve 15 may expand the refrigerant introduced through the refrigerant line 11 and flow the expanded refrigerant to the third heat-exchanger 16.

The refrigerant having passed through the third heat-exchanger 16 may sequentially pass through the internal heat-exchanger 17a, the accumulator 17, the compressor 10 along the refrigerant line 11.

In other words, the refrigerant discharged from the chiller 20 and the refrigerant discharged from the third heat-exchanger 16 may pass through the internal heat-exchanger 17a and the accumulator 17 along the refrigerant line 11, and then be supplied to the compressor 10.

The air introduced into the HVAC module 12 may be cooled by the low-temperature refrigerant introduced into the third heat-exchanger 16 while passing through the third heat-exchanger 16.

Since the cooled air is directly introduced into the vehicle interior by passing through the first heat-exchanger 13 that is not supplied with the refrigerant, it may cool the vehicle interior.

The refrigerant with increased cooling amount while sequentially passing through the second heat-exchanger 14 and the internal heat-exchanger 17a is expanded and supplied to the third heat-exchanger 16, and accordingly, the refrigerant may be evaporated to a further lower temperature.

In other words, in the present embodiment, the second heat-exchanger 14 may cool the refrigerant through heat-exchange with the air, and the internal heat-exchanger 17a may additionally cool the refrigerant through heat-exchange with the low-temperature refrigerant.

By such an operation, the heat pump system may more efficiently cool the R744 refrigerant formed of carbon dioxide, thereby providing advantage to formation of sub-cooling of the refrigerant.

In addition, as the refrigerant formed with sub-cooling is evaporated at a lower temperature at the third heat-exchanger 16, the temperature of the air passing through the third heat-exchanger 16 may be further decreased, thereby improving the cooling performance and efficiency.

While repeatedly performing the above-described processes, the refrigerant may cool the vehicle interior in the cooling mode of the vehicle interior and at the same time, cool the coolant through heat-exchange while passing through the chiller 20.

The low temperature coolant cooled at the chiller 20 flows to the battery module 5 through the second line 4. Accordingly, the battery module 5 may be efficiently cooled by the supplied low temperature coolant.

Therefore, as described above, when a heat pump system for a vehicle according to an embodiment is applied, since cooling or heating of a vehicle interior is performed by using natural refrigerant, it is possible to respond to environmental regulations, and the overall marketability of the vehicle may be improved.

In addition, according to the disclosure, by applying the R744 refrigerant that is a natural refrigerant using carbon dioxide, cooling and heating performance may be maximized by being operated in a super-critical region that is a state in which pressure and temperature of the refrigerant are higher than a threshold pressure and temperature, for cooling and heating of the vehicle interior.

In addition, according to the disclosure, the temperature of the battery module 5 is efficiently adjusted by using a single chiller 20 heat-exchanging the coolant and refrigerant depending on the vehicle mode, and thereby streamlining and simplification of the system may be achieved.

In addition, according to an embodiment, by efficiently adjusting the temperature of the battery module 5, the optimal performance of the battery module 5 may be enabled, and the overall travel distance of the vehicle may be increased due to the efficient management of the battery module 5.

In addition, in the heating mode of the vehicle interior, according to the present disclosure, since the refrigerant is expanded and branched to be supplied to the second heat-exchanger 14 and the chiller 20, respectively, the flow control of the refrigerant may become easy, the ambient air heat and a waste heat of electrical components may be smoothly recollected, and at the same time, an optimal design of the chiller 20 for cooling the battery module may be achieved.

In addition, according to an embodiment, it is possible to reduce manufacturing cost and weight through simplification of an entire system, and to improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

2, 4: first and second lines
3: electrical component
5: battery module
10: compressor
11: refrigerant line
12: HVAC module
13, 14, 16: first, second, and third heat-exchangers
15: first expansion valve
17: accumulator
17a: internal heat-exchanger
20: chiller
21: first connection line
23: second expansion valve
31: second connection line
33: third expansion valve
41: third connection line
43: the third valve
51: fourth connection line
53: fourth expansion valve
61: fifth connection line
63: fourth valve

What is claimed is:
1. A heat pump system for a vehicle, the heat pump system comprising:
an air conditioner unit comprising a compressor, a first heat-exchanger, a second heat-exchanger, a first expansion valve, and a third heat-exchanger that are connected through a refrigerant line to circulate a refrigerant through the refrigerant line; and
a chiller connected to the refrigerant line through a first connection line, and configured to adjust the temperature of a coolant by heat-exchanging the refrigerant supplied from the air conditioner unit with the coolant,
wherein the air conditioner unit further comprises:
a first valve provided in the refrigerant line between the first heat-exchanger and the second heat-exchanger;
a second valve provided in the refrigerant line between the third heat-exchanger and the compressor;
a second expansion valve provided in the first connection line;
a second connection line having a first end connected to the refrigerant line between the first heat-exchanger and the second heat-exchanger, and a second end connected to the refrigerant line between the second heat-exchanger and the third heat-exchanger; and
a third expansion valve provided in the second connection line.
2. The heat pump system of claim 1, wherein the air conditioner unit further comprises:
a third connection line having a first end connected to the refrigerant line between the compressor and the first heat-exchanger, and a second end connected to the refrigerant line between the first heat-exchanger and the second heat-exchanger;
a third valve provided in the third connection line;
a fourth connection line having a first end connected to the refrigerant line between the second heat-exchanger and the third heat-exchanger, and a second end connected to the refrigerant line between the third heat-exchanger and the compressor;
a fourth expansion valve provided in the fourth connection line;
a fifth connection line having a first end connected to the refrigerant line between the third heat-exchanger and the compressor, and a second end connected to the refrigerant line between the first heat-exchanger and the second heat-exchanger; and
a fourth valve provided in the fifth connection line.
3. The heat pump system of claim 2, wherein the air conditioner unit further comprises:
an accumulator provided in the refrigerant line between the third heat-exchanger and the compressor; and
an internal heat-exchanger provided inside the accumulator, and configured to heat-exchange the refrigerant supplied from the second heat-exchanger and the refrigerant supplied from the third heat-exchanger with each other, and to supply a liquid refrigerant among the heat-exchanged refrigerant to the third heat-exchanger.
4. The heat pump system of claim 3, wherein, in a heating mode of a vehicle interior:
a portion of the refrigerant line connecting a first end of the first connection line to the second end of the second connection line is closed by an operation of the first expansion valve;
a portion of the refrigerant line connecting the first end of the second connection line and the second end of the fifth connection line is closed by an operation of the first valve;
a portion of the refrigerant line connecting a second end of the fourth connection line and a second end of the first connection line is closed by an operation of the second valve;
the first connection line is opened by an operation of the second expansion valve;
the second connection line is opened by an operation of the third expansion valve;
the third connection line is closed by an operation of the third valve;
the fourth connection line is opened by an operation of the fourth expansion valve; and
the fifth connection line is opened by an operation of the fourth valve.
5. The heat pump system of claim 4, wherein the fourth expansion valve is configured to expand the refrigerant such that the expanded refrigerant is supplied to the second heat-exchanger, the internal heat-exchanger, and the chiller, respectively.
6. The heat pump system of claim 4, wherein:
a partial refrigerant among the refrigerant flowing from the third heat-exchanger into the fourth connection line flows into the second heat-exchanger; and
a remaining refrigerant among the refrigerant flowing from the third heat-exchanger into the fourth connection line flows into the internal heat-exchanger.
7. The heat pump system of claim 4, wherein:
a partial refrigerant among the refrigerant discharged from the fourth expansion valve passes through the internal heat-exchanger along the refrigerant line, and then flows into the chiller; and the refrigerant discharged from the second heat-exchanger and the chiller passes through the internal heat-exchanger and the accumulator, and then is supplied to the compressor.

8. The heat pump system of claim 4, wherein:

the second expansion valve supplies the refrigerant introduced through the first connection line to the chiller without expansion; and the third expansion valve supplies the refrigerant introduced through the second connection line to the third heat-exchanger without expansion.

9. The heat pump system of claim 3, wherein, in a heating and dehumidifying mode of a vehicle interior:

a portion of the refrigerant line connecting a first end of the first connection line and the second end of the second connection line is opened by an operation of the first expansion valve;

a portion of the refrigerant line connecting the first end of the second connection line and the second heat-exchanger is closed by an operation of the first valve;

the refrigerant line connecting the third heat-exchanger and the accumulator is opened by an operation of the second valve;

the refrigerant line connecting the second heat-exchanger and the internal heat-exchanger is closed;

the first connection line is opened by an operation of the second expansion valve;

the second connection line is opened by an operation of the third expansion valve;

the third connection line is closed by an operation of the third valve;

the fourth connection line is closed by an operation of the fourth expansion valve; and the fifth connection line is closed by an operation of the fourth valve.

10. The heat pump system of claim 9, wherein the third expansion valve is configured to expand the refrigerant introduced through the second connection line from the first heat-exchanger, and to supply the expanded refrigerant to the third heat-exchanger and the chiller, respectively.

11. The heat pump system of claim 10, wherein the first expansion valve and the second expansion valve is configured to flow the introduced refrigerant without expansion.

12. The heat pump system of claim 3, wherein, when cooling of a battery module is required in a cooling mode of a vehicle interior:

a portion of the refrigerant line connecting the compressor and the first heat-exchanger and a portion of the refrigerant line connecting the first heat-exchanger and the second heat-exchanger is closed by an operation of the first valve;

the first connection line is opened by an operation of the second expansion valve;

the second connection line is closed by an operation of the third expansion valve;

the third connection line is opened by an operation of the third valve;

the fourth connection line is closed by an operation of the fourth expansion valve; and the fifth connection line is closed by an operation of the fourth valve.

13. The heat pump system of claim 12, wherein:

the first expansion valve is configured to expand the refrigerant introduced through the refrigerant line and flow the expanded refrigerant to the third heat-exchanger; and the second expansion valve is configured to expand the refrigerant introduced into the first connection line and flow the expanded refrigerant to the chiller so as to cool the battery module by using the coolant heat-exchanged with the refrigerant in the chiller.

14. The heat pump system of claim 12, wherein:

the refrigerant discharged from the compressor flows into the second heat-exchanger along the third connection line;

a partial refrigerant among the refrigerant discharged from the internal heat-exchanger flows into the chiller along the first connection line;

a remaining refrigerant among the refrigerant discharged from the internal heat-exchanger flows into the first expansion valve along the refrigerant line; and the refrigerant discharged from the chiller and the refrigerant discharged from the third heat-exchanger passes through the internal heat-exchanger and the accumulator along the refrigerant line, and then is supplied to the compressor.

15. The heat pump system of claim 1, wherein the second heat-exchanger and the third heat-exchanger are configured to cool or evaporate an interiorly introduced refrigerant.

16. The heat pump system of claim 1, wherein:

a first end of the first connection line is connected to the refrigerant line between the second heat-exchanger and the first expansion valve; and a second end of the first connection line is connected to the refrigerant line between the third heat-exchanger and the compressor.

17. The heat pump system of claim 1, wherein the refrigerant is R744 refrigerant formed of carbon dioxide.

18. The heat pump system of claim 1, wherein the chiller is connected to an electrical component and a battery module through a first line and a second line circulating the coolant, respectively.

19. The heat pump system of claim 1, wherein:

the first heat-exchanger, the second heat-exchanger, and the third heat-exchanger are air-cooled gas coolers configured to heat-exchange an interiorly introduced refrigerant with air; and the chiller is a water-cooled gas cooler configured to heat-exchange the interiorly introduced refrigerant with the coolant.

20. The heat pump system of claim 2, wherein:

the first expansion valve, the second expansion valve, the third expansion valve, and the fourth expansion valve are electronic expansion valves configured to selectively expand the refrigerant while controlling flow movement of the refrigerant.

* * * * *